(12) United States Patent
Zeng et al.

(10) Patent No.: US 12,498,079 B2
(45) Date of Patent: Dec. 16, 2025

(54) HOLDER FOR MONITOR, ASSEMBLY OF HOLDER AND MONITOR, EXTRACORPOREAL BLOOD TREATMENT APPARATUS, AND USE OF HOLDER

(71) Applicant: Fresenius Medical Care Deutschland GmbH, Bad Homburg (DE)

(72) Inventors: Chaowei Zeng, Shanghai (CN); Zhongxiang Liang, Shanghai (CN)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 317 days.

(21) Appl. No.: 18/041,112

(22) PCT Filed: Aug. 11, 2020

(86) PCT No.: PCT/CN2020/108491
§ 371 (c)(1),
(2) Date: Feb. 9, 2023

(87) PCT Pub. No.: WO2022/032491
PCT Pub. Date: Feb. 17, 2022

(65) Prior Publication Data
US 2023/0400142 A1 Dec. 14, 2023

(51) Int. Cl.
*F16M 11/10* (2006.01)
*E05D 3/10* (2006.01)
(Continued)

(52) U.S. Cl.
CPC .......... *F16M 11/126* (2013.01); *F16M 11/10* (2013.01); *F16M 11/2014* (2013.01);
(Continued)

(58) Field of Classification Search
CPC . E05D 11/0081; E05D 3/10; E05Y 2400/654; G06F 1/1683; G06F 1/162; F16M 11/06; F16M 11/08; F16M 11/10
(Continued)

(56) References Cited

U.S. PATENT DOCUMENTS

| 4,618,886 A | 10/1986 | Mooney |
| 6,801,426 B2 * | 10/2004 | Ichimura ............ F16M 11/2014 248/371 |

(Continued)

FOREIGN PATENT DOCUMENTS

| CN | 109597092 | 4/2019 |
| CN | 110425396 | 11/2019 |

(Continued)

OTHER PUBLICATIONS

Extended European Search Report in European Appln. No. 20948990.5, dated Mar. 13, 2024, 8 pages.
(Continued)

Primary Examiner — Alfred J Wujciak
(74) Attorney, Agent, or Firm — Fish & Richardson P.C.

(57) ABSTRACT

Herein disclosed is a holder for a monitor, comprising: a first rotation mechanism configured to allow the monitor to be rotated around a first rotation axis; a second rotation mechanism configured to allow the monitor to be rotated around a second rotation axis which is not parallel to the first rotation axis; and a cable routing path configured to allow for routing at least one cable at least partially along the first rotation axis and the second rotation axis within the holder; wherein the second rotation mechanism comprises a first hinge and a second hinge, wherein the second hinge is configured to route the cable to the monitor through an inner cavity thereof. Also disclosed are a corresponding assembly, a corresponding extracorporeal blood treatment apparatus and
(Continued)

a corresponding use. Such a holder has a simple structure and good performance.

17 Claims, 5 Drawing Sheets

(51) Int. Cl.
| | |
|---|---|
| *E05D 11/00* | (2006.01) |
| *F16M 11/12* | (2006.01) |
| *F16M 11/20* | (2006.01) |
| *F16M 13/02* | (2006.01) |
| *G06F 1/16* | (2006.01) |
| *H05K 5/02* | (2006.01) |

(52) U.S. Cl.
CPC ......... *F16M 13/022* (2013.01); *H05K 5/0234* (2013.01); *H05K 5/0247* (2013.01); *E05D 3/10* (2013.01); *E05D 11/0081* (2013.01); *E05Y 2400/654* (2013.01); *F16M 2200/022* (2013.01); *G06F 1/162* (2013.01); *G06F 1/1683* (2013.01)

(58) Field of Classification Search
USPC .......... 16/366, 367, 386; 248/133, 139, 141, 248/140, 142, 149, 371, 395, 397, 162.1, 248/425
See application file for complete search history.

(56) References Cited

U.S. PATENT DOCUMENTS

| | | | |
|---|---|---|---|
| 7,717,629 | B2 | 5/2010 | Kenoyer et al. |
| 2009/0021901 | A1 | 1/2009 | Stothers |
| 2011/0110670 | A1* | 5/2011 | Atkinson ............... G06F 1/1681 |
| | | | 361/679.21 |
| 2013/0083458 | A1 | 4/2013 | Chien et al. |
| 2020/0201388 | A1* | 6/2020 | Spyrison ................ F16M 11/10 |

FOREIGN PATENT DOCUMENTS

| | | |
|---|---|---|
| CN | 209671946 | 11/2019 |
| CN | 209671957 | 11/2019 |
| EP | 3377142 | 4/2020 |
| WO | WO 2020/132303 | 6/2020 |

OTHER PUBLICATIONS

International Search Report and Written Opinion in International Appln. No. PCT/CN2020/108491, mailed May 10, 2021, 9 pages.

* cited by examiner

HOLDER FOR MONITOR, ASSEMBLY OF HOLDER AND MONITOR, EXTRACORPOREAL BLOOD TREATMENT APPARATUS, AND USE OF HOLDER

CROSS-REFERENCE TO RELATED APPLICATIONS

The present application is the national stage entry of International Patent Application No. PCT/CN2020/108491, filed on Aug. 11, 2020, the disclosure of which is incorporated herein by reference.

TECHNICAL FIELD

The disclosure relates to a holder for a monitor, an assembly of the holder and the monitor, an extracorporeal blood treatment apparatus comprising the holder, and a use of the holder for the monitor for a medical device.

BACKGROUND ART

In many application fields, such as in medical applications, a monitor is often needed to monitor or display some parameters, for example patient's physiological parameters and treatment parameters. To this end, a supporting device, also known as a holder, is needed to support or hold the monitor. With this holder, the monitor can be fixed on a suitable supporting body, for example a medical apparatus.

In use, angles (for example, an angle relative to the horizontal and/or vertical direction) of the monitor may need to be adjusted as desired. Therefore, it is advantageous to enable the monitor to be rotated in two different directions by means of the holder.

In addition, cables connected to the monitor are routed by means of the holder to simplify installation and keep tidy.

However, the exiting holders still have many shortcomings, for example, easy bending or twisting of the cables, a high number of parts, not easy to clean with disinfectant, poor waterproof and so on.

Therefore, there is a need to further improve the holder.

SUMMARY OF THE DISCLOSURE

In view of the problems existing in the prior art, an object of the disclosure is to provide a holder for a monitor, an assembly of the holder and the monitor, an extracorporeal blood treatment apparatus comprising the holder, and a use of the holder for the monitor for a medical device.

According to a first aspect of the present disclosure, provided is a holder for a monitor, comprising: a first rotation mechanism configured to allow the monitor to be rotated around a first rotation axis; a second rotation mechanism configured to allow the monitor to be rotated around a second rotation axis which is not parallel to the first rotation axis; and a cable routing path configured to allow for routing at least one cable at least partially along the first rotation axis and the second rotation axis within the holder; wherein the second rotation mechanism comprises a first hinge and a second hinge, wherein the second hinge is configured to route the cable to the monitor through an inner cavity thereof.

According to an optional embodiment of the present disclosure, only the second hinge is configured to route the cable to the monitor through the inner cavity thereof.

According to an optional embodiment of the present disclosure, the first rotation axis is perpendicular to the second rotation axis; and/or the first rotation mechanism is connected with the second rotation mechanism; and/or the holder further comprises a sleeve disposed at least partially along the first rotation axis so as to form at least a portion of the cable routing path.

According to an optional embodiment of the present disclosure, the first rotation axis intersects the second rotation axis; and/or the first rotation mechanism comprises a base and a supporting arm configured to be rotatable relative to the base around the first rotation axis.

According to an optional embodiment of the present disclosure, the first rotation mechanism is configured substantially in a shape of an international chess piece; and/or the first rotation mechanism further comprises a first rotation angle limiting structure for limiting a rotation angle of the supporting arm relative to the base around the first rotation axis; and/or the first rotation mechanism further comprises a first force adjusting structure for adjusting a force required to rotate the supporting arm relative to the base around the first rotation axis; and/or the second rotation mechanism further comprises a second rotation angle limiting structure for limiting a rotation angle of the second rotation mechanism around the second rotation axis; and/or the second rotation mechanism further comprises a second force adjusting structure for adjusting a force required to rotate the second rotation mechanism around the second rotation axis.

According to an optional embodiment of the present disclosure, the second force adjusting structure is on a side of the first hinge only and/or the second hinge is supported by the first rotation mechanism to be freely rotatable.

According to an optional embodiment of the present disclosure, the first hinge is configured to be adapted to be connected between the first rotation mechanism and the monitor and/or the second hinge is configured to be adapted to be connected between the first rotation mechanism and the monitor.

According to an optional embodiment of the present disclosure, the first hinge and/or the second hinge are disposed at a top end of the supporting arm opposite to the base; and/or the first hinge and the second hinge are disposed at opposite sides of the supporting arm respectively; and/or the first hinge extends along the second rotation axis at a first side of the first rotation axis and the second hinge extends along the second rotation axis at a second side of the first rotation axis; and/or the first hinge and the second hinge are formed integrally.

According to an optional embodiment of the present disclosure, the top end of the supporting arm is configured in a substantially spherical shape; and/or the top end of the supporting arm is provided with a first receiving seat for receiving the first hinge and/or a second receiving seat for receiving the second hinge, which is opposite to the first receiving seat.

According to an optional embodiment of the present disclosure, the first hinge is configured to hold the monitor in a fixed position relative to the second rotation axis; and/or the second hinge is configured to route the cable to the monitor through an inner cavity thereof.

According to an optional embodiment of the present disclosure, the cable is routed parallel to the first rotation axis inside the first rotation mechanism and is routed parallel to the second rotation axis and then perpendicular to the second rotation axis inside the second hinge, wherein a segment of the second hinge, in which cable is perpendicular to the second rotation axis, is connected to the monitor, and/or the cable is connected to the monitor at a position which is not in line with the first rotation axis.

According to an optional embodiment of the present disclosure, the holder is configured to hold the monitor in the fixed position relative to the second rotation axis only by means of the first hinge; and/or the second hinge is configured to only be used for routing the cable.

According to an optional embodiment of the present disclosure, the second hinge has a first hollow cylindrical part in which the cable is routed parallel to the second rotation axis and has a second hollow cylindrical part which is perpendicular to the first hollow cylindrical part and the first hinge has a hollow cylindrical part which is parallel to the second hollow cylindrical part.

According to an optional embodiment of the present disclosure, the supporting arm comprises a rotation shaft, and the base comprises a receiving cavity for receiving the rotation shaft so that the rotation shaft is rotatable within the receiving cavity around the first rotation axis; and/or the first hinge comprises a pivotal shaft and a pivotal arm pivoted on the pivotal shaft; and/or the second rotation angle limiting structure and the second force adjusting structure are disposed at the first hinge.

According to an optional embodiment of the present disclosure, the first rotation angle limiting structure is disposed between the base and the supporting arm; and/or the first force adjusting structure is disposed at a side of the base opposite to the first rotation angle limiting structure; and/or the second rotation angle limiting structure is disposed between the pivotal arm and the first receiving seat; and/or the second force adjusting structure is disposed at an outer end of the pivotal arm opposite to the first receiving seat.

According to an optional embodiment of the present disclosure, the first rotation angle limiting structure comprises a first slot disposed on one of the base and the supporting arm and a first projection disposed on the other of the base and the supporting arm, wherein the first projection is configured to be adapted to be inserted and guided in the first slot; and/or the second rotation angle limiting structure comprises a second slot disposed on one of the first receiving seat and the pivotal arm and a second projection disposed on the other of the first receiving seat and the pivotal arm, wherein the second projection is configured to be adapted to be inserted and guided in the second slot; and/or the first force adjusting structure comprises a first washer assembly, a first adjusting force applying structure configured to apply a first pressing force on the first washer assembly, and a first rotation stop structure configured to stop a rotation of one washer of the first washer assembly and the rotation shaft relative to each other around the first rotation axis; and/or the second force adjusting structure comprises a second washer assembly, a second adjusting force applying structure configured to apply a second pressing force on the second washer assembly, and a second rotation stop structure configured to stop a rotation of one washer of the second washer assembly relative to the pivotal shaft around the second rotation axis.

According to an optional embodiment of the present disclosure, the first slot and/or the second slot is configured in a form of a circular arc; and/or the first washer assembly comprises a pair of first washers provided with first mating engaging structures to control a rotation of the pair of first washers relative to each other around the first rotation axis; and/or the second washer assembly comprises a pair of second washers provided with second mating engaging structures to control a rotation of the pair of second washers relative to each other around the second rotation axis.

According to an optional embodiment of the present disclosure, the first adjusting force applying structure comprises a first axial force applying part for applying an axial pressing force on the first washer assembly; and/or the second adjusting force applying structure comprises a second axial force applying part for applying an axial pressing force on the second washer assembly; and/or the first rotation stop structure comprises a pair of first rotation stop structures disposed on the rotation shaft and one of the pair of first washers respectively to prevent a rotation of the rotation shaft and the one of the pair of first washers relative to each other around the first rotation axis and/or the second rotation stop structure comprises a pair of second rotation stop structures disposed on the pivotal shaft and one of the pair of second washers respectively to prevent a rotation of the pivotal shaft and one of the pair of second washers relative to each other around the second rotation axis.

According to an optional embodiment of the present disclosure, the first axial force applying part comprises a first screw; and/or the second axial force applying part comprises a second screw; and/or one of the first mating engaging structures comprises a first boss, and the other of the first mating engaging structures comprises a first recess; and/or one of the second mating engaging structures comprises a second boss and the other of the second mating engaging structures comprise a second recess; and/or one of the pair of first rotation stop structures comprises a first tab, and the other of the pair of first rotation stop structures comprises a first groove; and/or one of the pair of second rotation stop structures comprises a second tab, and the other of the pair of second rotation stop structures comprises a second groove.

According to an optional embodiment of the present disclosure, the first slot has the circular arc of 160-180 degrees; and/or the second slot has the circular arc of 105 degrees; and/or the first recess and/or the second recess is configured as a hole; and/or the first groove and/or the second groove is configured as an axial groove.

According to an optional embodiment of the present disclosure, the holder further comprises a detachable cover configured to cover the second force adjusting structure.

According to a second aspect of the present disclosure, provided is an assembly of the holder described above and a monitor, wherein the holder is used for holding the monitor.

According to a third aspect of the present disclosure, provided is an extracorporeal blood treatment apparatus, wherein the extracorporeal blood treatment apparatus comprises a holder described above; a monitor with a display surface configured to display visual images thereon; a housing comprising a control unit, wherein the control unit is placed inside the housing; and a cable, wherein the cable connects the monitor with the control unit.

The extracorporeal blood treatment apparatus can be a dialysis machine. The extracorporeal blood treatment apparatus can further comprise at least one blood pump, which is configured to move blood and/or a dialysis solution pump, which is configured to move a dialysis treatment solution. The blood pump and/or dialysis solution pump can be attached to the front surface of the housing or can be located inside the housing. The at least one blood pump can be a peristaltic pump or a roller pump or a membrane pump or an impeller pump.

The holder can be placed on an upper surface of the housing or on a side surface of the housing. Further, the monitor can be placed above the housing or can be placed beside the housing while the holder can be placed on the upper surface of the housing or on the side surface of the housing.

The control unit can be configured to operate the blood pump and/or dialysis solution pump and/or to control the monitor.

The cable can have at least two sections, wherein in a first section of the at least two sections, the cable is guided parallel to the first rotation axis and wherein in a second section of the at least two sections, the cable is guided parallel to the second rotation axis. The first section can, at least partially, be located below the monitor in a direction which is parallel to the first rotation axis. The second section can be located besides the monitor, so that the second section can be located on a same plane as the monitor, wherein the plane is perpendicular to the first rotation axis.

According to an optional embodiment of the present disclosure, the holder can be rotatable such that the monitor can face at least one of a left side and a right side of the housing. Further, the holder can be rotatable such that the monitor can be rotated by 360 degrees, or can be rotated by at least 180 degrees, or can be rotated by at least 90 degrees around the first rotation axis.

According to an optional embodiment of the present disclosure, the holder can be rotatable such that the monitor can face a direction away from an upper side of the housing and/or can face a direction to the upper side of the housing. Further, the holder can be rotatable such that the monitor can be rotated by at least 10 degrees, of at least 45 degrees or at least 90 degrees or at least 180 degrees around the second rotation axis.

According to a third aspect of the present disclosure, provided is a use of the holder described above for a monitor for a medical device.

According to an optional embodiment of the present disclosure, the medical device is a dialysis machine.

According to some embodiments of the present disclosure, the monitor can be supported only on one side leaving a space in the other side free for the cables, and/or twisting and bending of the cables can be decreased, and/or tension can be reduced during rotating around the first rotation axis and/or the second rotation axis. In addition, the number of parts is further reduced compared with the conventional holders, and the holder according to the present disclosure is good for disinfection and cleaning and has a good water proof performance.

BRIEF DESCRIPTION OF THE DRAWINGS

The disclosure and advantages thereof will be further understood by reading the following detailed description of some preferred exemplary embodiments with reference to the drawings in which.

DETAILED DESCRIPTION OF PREFERRED EMBODIMENTS

Some exemplary embodiments of the present disclosure will be described hereinafter in more details with reference to the drawings to better understand the basic concept of the present disclosure.

Figure 1:
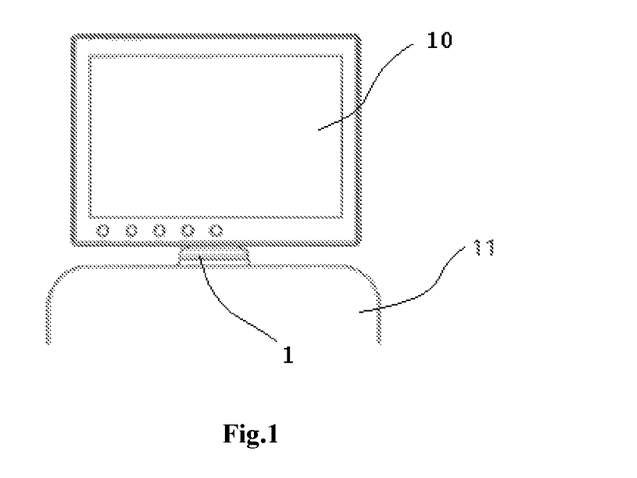
FIG. 1 exemplarily shows a status of a holder for holding a monitor, in particular a medical monitor in a front view.
Figure 2:
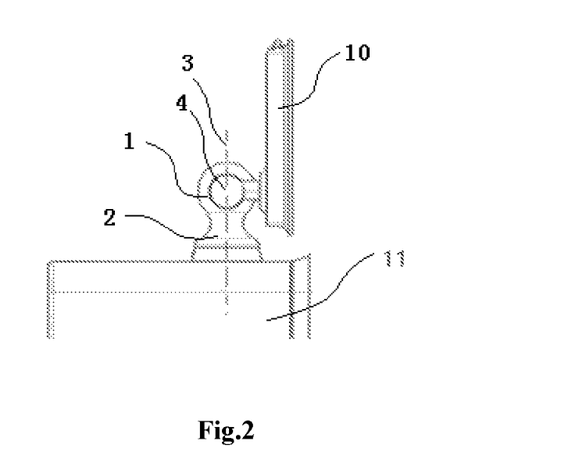
FIG. 2 shows such a status in a side view.
Figure 3:
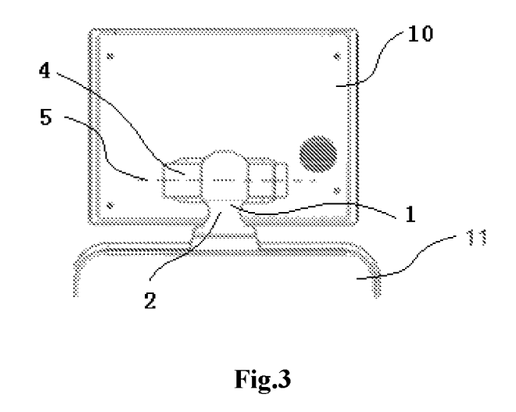
FIG. 3 shows such a status in a rear view.

FIG. 1 exemplarily shows a status of a holder 1 for holding a monitor 10, in particular a medical monitor in a front view. FIG. 2 shows such a status in a side view. FIG. 3 shows such a status in a rear view.

As shown in FIG. 2 and FIG. 3, the holder 1 can comprise a first rotation mechanism 2 configured to allow the monitor 10 to be rotated around a first rotation axis 3, a second rotation mechanism 4 configured to allow the monitor 10 to be rotated around a second rotation axis 5 which is not parallel to the first rotation axis 3. For example, the first rotation mechanism 2 can be mounted on a housing 11 as a supporting body and the monitor 10 can be connected with the second rotation mechanism 4.

The housing 11 can comprise a control unit and at least one blood pump.

A medical device whose housing 11 is only shown in FIG. 1 can be a dialysis machine. The holder 1 can be placed on an upper surface of the housing 11.

According to an exemplary embodiment of the present disclosure, the first rotation axis 3 can be perpendicular to the second rotation axis 5.

According to another exemplary embodiment of the present disclosure, the first rotation axis 3 can intersect the second rotation axis 5.

According to another exemplary embodiment of the present disclosure, the first rotation mechanism 2 can be connected with the second rotation mechanism 4.

Figure 4:
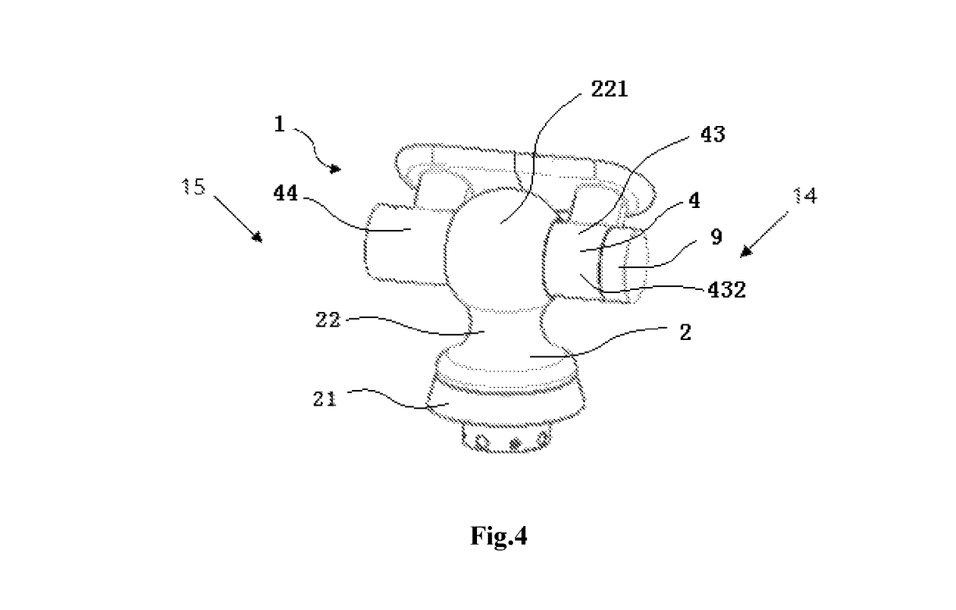
FIG. 4 shows the holder according to an exemplary embodiment of the present disclosure in a perspective view.

FIG. 4 shows the holder 1 according to an exemplary embodiment of the present disclosure in a perspective view.

As shown in FIG. 4, the first rotation mechanism 2 can comprise a base 21 to be fixed to other supporting body, for example, a medical apparatus, and a supporting arm 22 configured to be rotatable relative to the base 21 around the first rotation axis 3, and the second rotation mechanisms 4 can comprise a first hinge 43 and a second hinge 44, wherein the first hinge 43 extends along the second rotation axis 5 at a first side 14 of the first rotation axis 3 and the second hinge 44 extends along the second rotation axis 5 at a second side 15 of the first rotation axis 3. The first side 14 is opposite to the second side 15.

According to an exemplary embodiment of the present disclosure, the holder 1 can further comprise a cover 9 which can be detachably fitted on the first hinge 43.

According to an exemplary embodiment of the present disclosure, the first hinge 43 and/or the second hinge 44 can be disposed at a top end 221 of the supporting arm 22 opposite to the base 21.

According to an exemplary embodiment of the present disclosure, the first hinge 43 and the second hinge 44 are disposed at opposite sides of the supporting arm 22 respectively.

According to an exemplary embodiment of the present disclosure, the first rotation mechanism 2 can be configured substantially in a shape of an international chess piece. This shape is aesthetically pleasing and the top end 221 of the supporting arm 22 can receive reliably the first hinge 43 and the second hinge 44.

According to an exemplary embodiment of the present disclosure, the top end 221 of the supporting arm 22 can be configured in a substantially spherical shape.

According to an exemplary embodiment of the present disclosure, the top end 221 of the supporting arm 22 can be provided with a first receiving seat 222 for receiving the first hinge 43 and/or a second receiving seat 223 for receiving the second hinge 44, which can be opposite to the first receiving seat 222.

According to an exemplary embodiment of the present disclosure, the first hinge 43 can be configured to hold the monitor 10 in a fixed position relative to the second rotation axis 5.

Preferably, the holder 1 can be configured to hold the monitor 10 in the fixed position relative to the second rotation axis 5 only by means of the first hinge 43. In this case, the second hinge 44 can be configured to only be used for routing the cable 7. With this arrangement, bending and twisting of the cable 7 can be minimized during rotating of the first rotation mechanism 2 and the second rotation mechanism 4.

Figure 5:
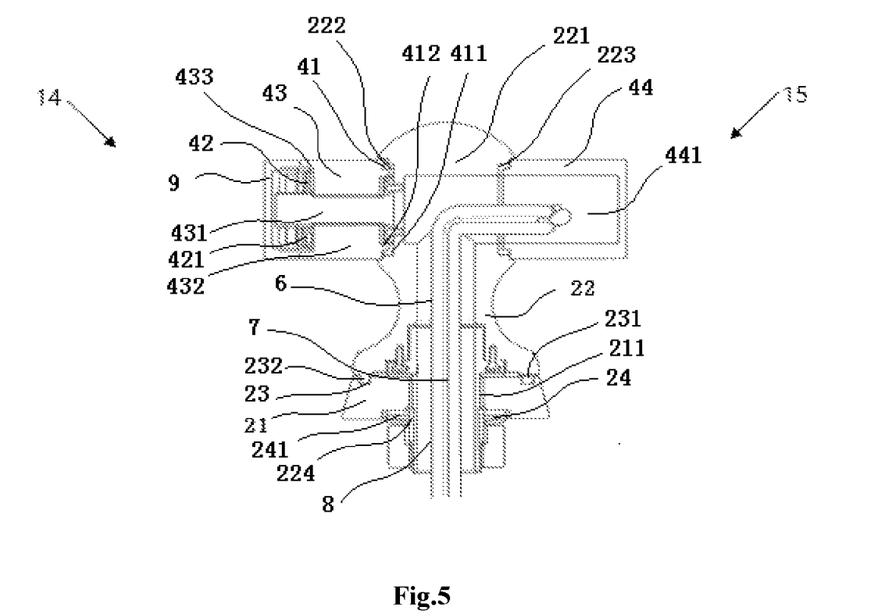
FIG. 5 shows a front sectional view of the holder according to an exemplary embodiment of the present disclosure.
Figure 6:
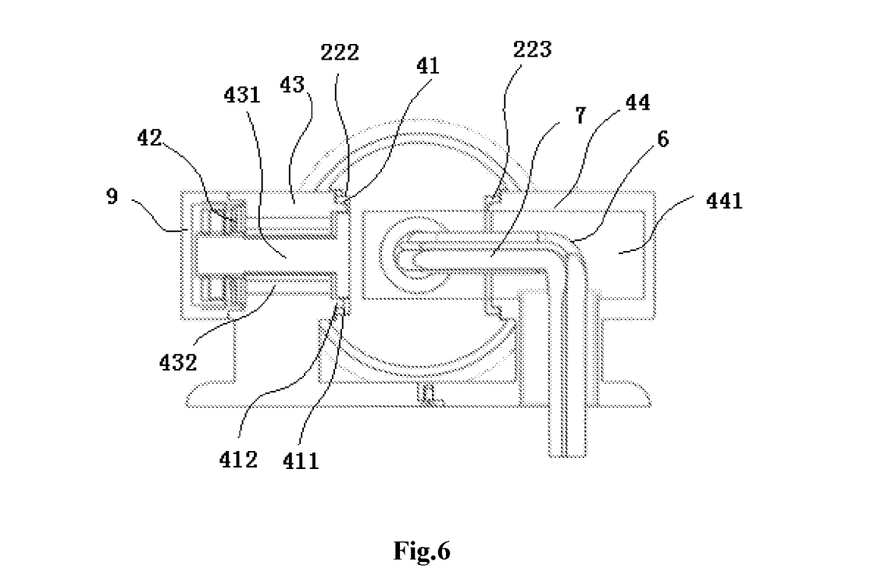
FIG. 6 shows a top sectional view of the holder as shown in FIG. 5.

FIG. 5 shows a front sectional view of the holder 1 according to an exemplary embodiment of the present disclosure. FIG. 6 shows a top sectional view of the holder 1 as shown in FIG. 5.

As shown in FIG. 5, the holder can comprise a cable routing path 6 configured to allow for routing at least one cable 7 at least partially along the first rotation axis 3 and the second rotation axis 5 within the holder 1.

The cable as shown in FIG. 5 has two sections, wherein in a first section of the two sections, the cable can be guided parallel to the first rotation axis and wherein in the second section of the two sections, the cable can be guided parallel to the second rotation axis. The first section can be partially located below the monitor in a direction which is parallel to the first rotation axis. The second section can be located besides the monitor, so that the second section can be located on a same plane as the monitor, wherein the plane is perpendicular to the first rotation axis.

According to an exemplary embodiment of the present disclosure, only one of the first hinge 43 and the second hinge 44 can be configured to route the cable 7 to the monitor 10 through an inner cavity 441 thereof. As shown FIG. 5, only the second hinge 44 can be configured to route the cable 7 to the monitor 10 through the inner cavity 441 thereof.

According to an exemplary embodiment of the present disclosure, the holder 1 further comprises a sleeve 8 disposed at least partially along the first rotation axis 3 so as to form at least a portion of the cable routing path 6. The sleeve 8 can be a plastic tube. With this sleeve 8, the cable 7 can be guided and positioned properly.

According to an exemplary embodiment of the present disclosure, the first rotation mechanism 2 can further comprise a first rotation angle limiting structure 23 for limiting a rotation angle of the supporting arm 22 relative to the base 21 around the first rotation axis 3. With the first rotation angle limiting structure 23, a rotation angle of the monitor 10 around the first rotation axis 3 can be limited.

The holder 1 is rotatable such that the monitor can face either of a left side and a right side of the housing 11. Further, the holder 1 is rotatable such that the monitor can face a direction away from an upper side of the housing 11 and/or can face a direction to the upper side of the housing.

According to an exemplary embodiment of the present disclosure, the first rotation angle limiting structure 23 can be disposed between the base 21 and the supporting arm 22.

According to an exemplary embodiment of the present disclosure, the first rotation angle limiting structure 23 can comprise a first slot 231 disposed on one of the base 21 and the supporting arm 22 and a first projection 232 disposed on the other of the base 21 and the supporting arm 22, wherein the first projection 232 can be configured to be adapted to be inserted and guided in the first slot 231. As shown in FIG. 5, the first slot 231 can be disposed on the base 21, and the first projection 232 is disposed on the supporting arm 22.

According to an exemplary embodiment of the present disclosure, the first rotation mechanism can further comprise a first force adjusting structure 24 for adjusting a force required to rotate the supporting arm 22 relative to the base 21 around the first rotation axis 3. With the first force adjusting structure 24, the supporting arm 22 and thus the monitor 10 can be rotated around the first rotation mechanism 2 only if a torque larger than a predetermined value is applied on the supporting arm 22, which is advantageous as a non-desired rotation of the monitor 10 around the first rotation mechanism 2 can be prevented.

According to an exemplary embodiment of the present disclosure, the first force adjusting structure 24 can be disposed at a side of the base 21 opposite to the first rotation angle limiting structure 23.

Similarly, according to an exemplary embodiment of the present disclosure, the second rotation mechanism 4 can further comprise a second rotation angle limiting structure 41 for limiting a rotation angle of the second rotation mechanism 4 around the second rotation axis 5. With the second rotation angle limiting structure 41, a rotation angle of the monitor 10 around the second rotation axis 5 can be limited.

According to an exemplary embodiment of the present disclosure, the second rotation mechanism 4 further can comprise a second force adjusting structure 42 for adjusting a force required to rotate the second rotation mechanism 4 around the second rotation axis 5. With the second force adjusting structure 24, the second rotation mechanism 4 and thus the monitor 10 can be rotated around the second rotation mechanism 5 only if a torque larger than a predetermined value is applied on the second rotation mechanism 4, which is advantageous as a non-desired rotation of the monitor 10 around the second rotation mechanism 5 can be prevented.

According to an exemplary embodiment of the present disclosure, the second rotation angle limiting structure 41 and the second force adjusting structure 42 can be disposed at the first hinge 43.

According to an exemplary embodiment of the present disclosure, as shown in FIGS. 2 to 4, the first hinge 43 can be configured to be adapted to be connected between the first rotation mechanism 2 and the monitor 10 and/or the second hinge 44 can be configured to be adapted to be connected between the first rotation mechanism 2 and the monitor 10.

According to an exemplary embodiment of the present disclosure, as shown in FIG. 5, the supporting arm 22 can comprise a rotation shaft 224, and the base 21 can comprise a receiving cavity 211 for receiving the rotation shaft 224 so that the rotation shaft 224 is rotatable within the receiving cavity 211 around the first rotation axis 3.

According to an exemplary embodiment of the present disclosure, the first hinge 43 can comprise a pivotal shaft 431 and a pivotal arm 432 pivoted on the pivotal shaft 431.

According to an exemplary embodiment of the present disclosure, the second rotation angle limiting structure 41 can be disposed between the pivotal arm 432 and the first receiving seat 222.

According to an exemplary embodiment of the present disclosure, the second force adjusting structure 42 can be disposed at an outer end 433 of the pivotal arm 432 opposite to the first receiving seat 222.

According to an exemplary embodiment of the present disclosure, the second rotation angle limiting structure 41 can comprise a second slot 411 disposed on one of the first receiving seat 222 and the pivotal arm 432 and a second projection 412 disposed on the other of the first receiving seat 222 and the pivotal arm 432, wherein the second projection 412 can be configured to be adapted to be inserted and guided in the second slot 411.

In the exemplary embodiment shown in FIG. 5, the second slot 411 is disposed on the first receiving seat 222 and the second projection 412 is disposed on the pivotal arm 432 correspondingly. Preferably, the second projection 412 is disposed at an end face of the pivotal arm 432 facing the first receiving seat 222.

According to an exemplary embodiment of the present disclosure, the first force adjusting structure 24 can comprise a first washer assembly 241, a first adjusting force applying structure (not shown) configured to apply a first pressing force on the first washer assembly 241, and a first rotation stop structure configured to stop a rotation of one washer of the first washer assembly 241 and the rotation shaft 224 relative to each other around the first rotation axis 3.

According to an exemplary embodiment of the present disclosure, the second force adjusting structure 42 can comprise a second washer assembly 421, a second adjusting force applying structure configured to apply a second pressing force on the second washer assembly 421, and a second rotation stop structure 422 configured to stop a rotation of one washer of the second washer assembly 421 relative to the pivotal shaft 431 around the second rotation axis 5.

The first force adjusting structure 24 can be similar to the second force adjusting structure 42.

Below, the first force adjusting structure 24 and the second force adjusting structure 42 will be described in connection with further exemplary embodiments of the present disclosure by referring to further illustrations.

Figure 7:
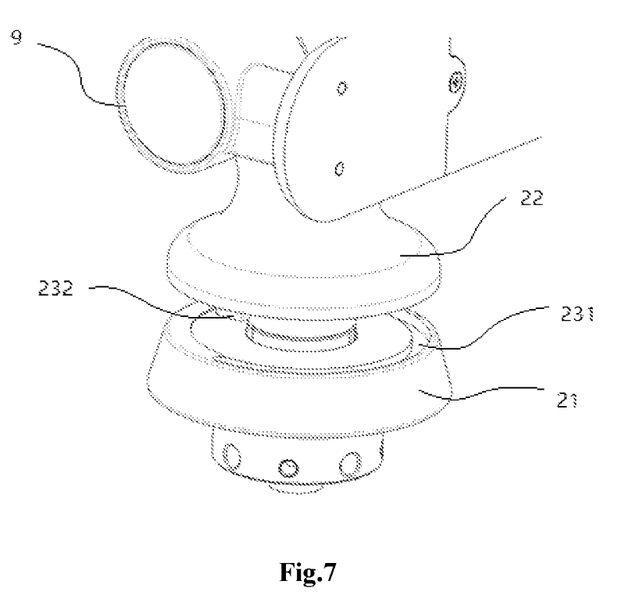
FIG. 7 exemplarily shows a partial exploded view of a first rotation mechanism to better illustrate a first rotation angle limiting structure.
Figure 8:
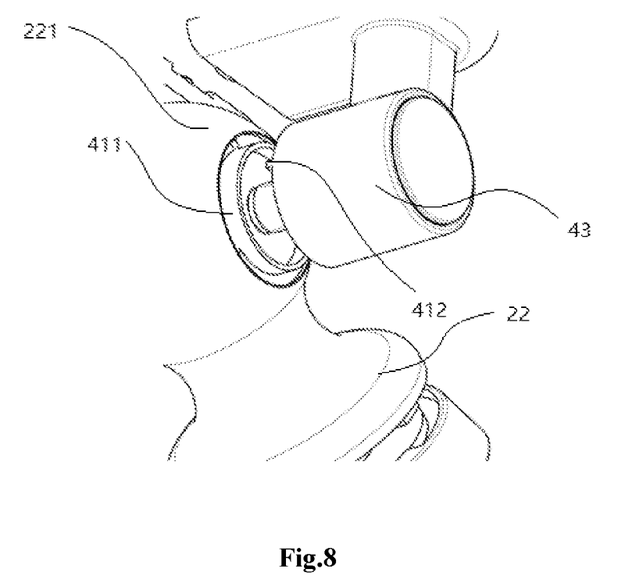
FIG. 8 exemplarily shows a partial exploded view of a first hinge to better illustrate a second rotation angle limiting structure.

FIG. 7 exemplarily shows a partial exploded view of the first rotation mechanism 2 to better illustrate the first rotation angle limiting structure 23. FIG. 8 exemplarily shows a partial exploded view of the first hinge 43 to better illustrate the second rotation angle limiting structure 41.

As shown in FIG. 7 and FIG. 8, according to an exemplary embodiment of the present disclosure, the first slot 231 and/or the second slot 411 can be configured in a form of a circular arc.

According to an exemplary embodiment of the present disclosure, the first slot 231 can have the circular arc of 160-180 degrees, and/or the second slot 411 can have the circular arc of 105 degrees.

Figure 9:
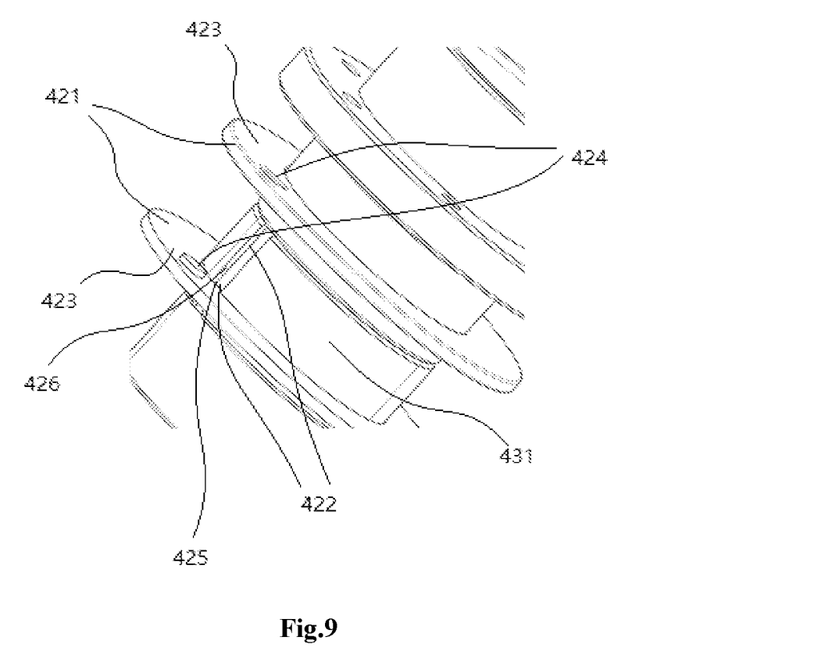
FIG. 9 exemplarily shows a partial exploded view of a second force adjusting structure, wherein the second washer assembly is in a separated status.
Figure 10:
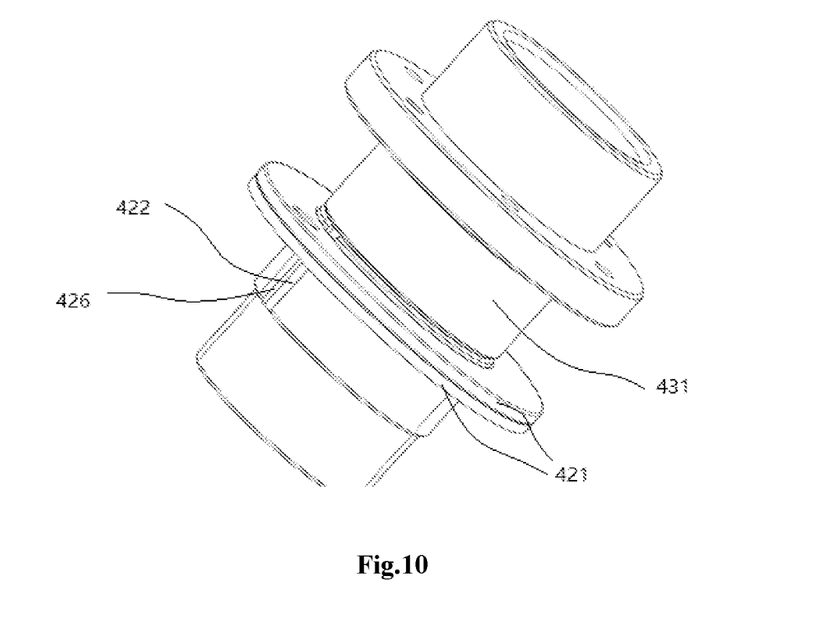
FIG. 10 shows a perspective view of the second force adjusting structure, wherein the second washer assembly is in a normal status.

FIG. 9 exemplarily shows a partial exploded view of the second force adjusting structure 42, wherein the second washer assembly 421 is in a separated status. FIG. 10 shows a perspective view of the second force adjusting structure 42, wherein the second washer assembly 421 is in a normal status.

The first washer assembly 241 can be similar to the second washer assembly 421.

As shown in FIG. 9 and FIG. 10, according to an exemplary embodiment of the present disclosure, the second washer assembly 421 can comprise a pair of second washers 423 provided with second mating engaging structures 424 to control a rotation of the pair of second washers 423 relative to each other around the second rotation axis 5.

When the pair of second washers 423 are pressed together, the second mating engaging structure 424 (for example, a boss) on one of the pair of second washers 423 can be engaged with the second mating engaging structure 424 (for example, a recess) on the other of the pair of second washers 423 to limit the rotation of the pair of second washers 423 relative to each other around the second rotation axis 5. It can be understood by the skilled person in the art that the tighter the pair of second washers 423, the more difficult they are rotated relative to each other.

Similarly, according to an exemplary embodiment of the present disclosure, the first washer assembly 241 can comprise a pair of first washers provided with first mating engaging structures to control a rotation of the pair of first washers relative to each other around the first rotation axis 3.

According to an exemplary embodiment of the present disclosure, the first adjusting force applying structure can comprise a first axial force applying part (not shown) for applying an axial pressing force on the first washer assembly 241.

According to an exemplary embodiment of the present disclosure, the second adjusting force applying structure can comprise a second axial force applying part (not shown) for applying an axial pressing force on the second washer assembly 421.

According to an exemplary embodiment of the present disclosure, the first rotation stop structure can comprise a pair of first rotation stop structures disposed on the rotation shaft 224 and one of the pair of first washers respectively to prevent a rotation of the rotation shaft 224 and the one of the pair of first washers relative to each other around the first rotation axis 3.

According to an exemplary embodiment of the present disclosure, the second rotation stop structure 422 can comprise a pair of second rotation stop structures disposed on the pivotal shaft 431 and one of the pair of second washers 423 respectively to prevent a rotation of the pivotal shaft 431 and one of the pair of second washers 423 relative to each other around the second rotation axis 5.

According to an exemplary embodiment of the present disclosure, the first axial force applying part can comprise a first screw.

According to an exemplary embodiment of the present disclosure, the second axial force applying part can comprise a second screw.

According to an exemplary embodiment of the present disclosure, one of the pair of first rotation stop structure can comprise a first tab, and the other of the pair of first rotation stop structures can comprise a first groove.

According to an exemplary embodiment of the present disclosure, as shown in FIG. 9, one of the pair of second rotation stop structures can comprise a second tab 425 (for example on one of the pair of second washers 423), and the other of the pair of second rotation stop structures can comprise a second groove 426 (for example on the pivotal shaft 431).

According to an exemplary embodiment of the present disclosure, the first recess and/or the second recess can be configured as a hole. In FIG. 9, the second recess is shown as a hole.

According to an exemplary embodiment of the present disclosure, the first groove and/or the second groove can be configured as an axial groove. In FIG. 9 and FIG. 10, the second groove is shown as an axial groove.

According to an exemplary embodiment of the present disclosure, the cover 9 can be configured to cover the second force adjusting structure 42. If the second force adjusting structure 42 needs to be adjusted, the cover 9 can be detached to access the second force adjusting structure 42. Moreover, by using the cover, foreign particles cannot enter the first hinge 43. Therefore, the specific hygiene standards for medical apparatuses can be met.

According to an exemplary embodiment of the present disclosure, further provided is an assembly of the holder 1 and the monitor 10, wherein the holder is used for holding the monitor 10.

Further, proposed is a use of the holder 1 for a monitor for a medical device, for example, a dialysis machine.

While certain embodiments have been described, these embodiments have been presented by way of example only, and are not intended to limit the scope of the disclosure. The attached claims and their equivalents are intended to cover all the modifications, substitutions and changes as would fall within the scope and spirit of the disclosure.

The invention claimed is:

1. A holder for a monitor, comprising:
a first rotation mechanism configured to allow the monitor to be rotated around a first rotation axis;
a second rotation mechanism configured to allow the monitor to be rotated around a second rotation axis which is not parallel to the first rotation axis; and
a cable routing path configured to allow for routing at least one cable at least partially along the first rotation axis and the second rotation axis within the holder;
wherein the second rotation mechanism comprises a first hinge and a second hinge, wherein the second hinge is configured to route the cable to the monitor through an inner cavity thereof; and
wherein the second hinge has a first hollow cylindrical part in which the cable is routed parallel to the second rotation axis and has a second hollow cylindrical part which is perpendicular to the first hollow cylindrical part and the first hinge has a hollow cylindrical part which is parallel to the second hollow cylindrical part.

2. The holder according to claim 1, wherein
only the second hinge is configured to route the cable to the monitor, and/or
the holder further comprises a sleeve disposed at least partially along the first rotation axis so as to form at least a portion of the cable routing path.

3. The holder according to claim 1, wherein
the first rotation mechanism comprises a base and a supporting arm configured to be rotatable relative to the base around the first rotation axis.

4. The holder according to claim 1, wherein
the first rotation mechanism further comprises a first rotation angle limiting structure for limiting a rotation angle of the supporting arm relative to the base around the first rotation axis; and/or
the first rotation mechanism further comprises a first force adjusting structure for adjusting a force required to rotate the supporting arm relative to the base around the first rotation axis; and/or
the second rotation mechanism further comprises a second rotation angle limiting structure for limiting a rotation angle of the second rotation mechanism around the second rotation axis; and/or
the second rotation mechanism further comprises a second force adjusting structure for adjusting a force required to rotate the second rotation mechanism around the second rotation axis.

5. The holder according to claim 4, wherein
the second force adjusting structure is on a side of the first hinge only and/or the second hinge is supported by the first rotation mechanism to be freely rotatable.

6. The holder according to claim 4, wherein
the supporting arm comprises a rotation shaft, and the base comprises a receiving cavity for receiving the rotation shaft so that the rotation shaft is rotatable within the receiving cavity around the first rotation axis; and/or
the first hinge comprises a pivotal shaft and a pivotal arm pivoted on the pivotal shaft; and/or
the second rotation angle limiting structure and the second force adjusting structure are disposed at the first hinge.

7. The holder according to claim 4, wherein
the first rotation angle limiting structure is disposed between the base and the supporting arm; and/or
the first force adjusting structure is disposed at a side of the base opposite to the first rotation angle limiting structure; and/or
the second rotation angle limiting structure is disposed between the pivotal arm and the first receiving seat; and/or
the second force adjusting structure is disposed at an outer end of the pivotal arm opposite to the first receiving seat.

8. The holder according to claim 7, wherein
the holder further comprises a detachable cover configured to cover the second force adjusting structure.

9. The holder according to claim 4, wherein
the first rotation angle limiting structure comprises a first slot disposed on one of the base and the supporting arm and a first projection disposed on the other of the base and the supporting arm, wherein the first projection is configured to be adapted to be inserted and guided in the first slot; and/or
the second rotation angle limiting structure comprises a second slot disposed on one of the first receiving seat and the pivotal arm and a second projection disposed on the other of the first receiving seat and the pivotal arm, wherein the second projection is configured to be adapted to be inserted and guided in the second slot; and/or
the first force adjusting structure comprises a first washer assembly, a first adjusting force applying structure configured to apply a first pressing force on the first washer assembly, and a first rotation stop structure configured to stop a rotation of one washer of the first washer assembly and the rotation shaft relative to each other around the first rotation axis; and/or
the second force adjusting structure comprises a second washer assembly, a second adjusting force applying structure configured to apply a second pressing force on the second washer assembly, and a second rotation stop structure configured to stop a rotation of one washer of the second washer assembly relative to the pivotal shaft around the second rotation axis.

10. The holder according to claim 9, wherein
the first slot and/or the second slot is configured in a form of a circular arc; and/or
the first washer assembly comprises a pair of first washers provided with first mating engaging structures to control a rotation of the pair of first washers relative to each other around the first rotation axis; and/or
the second washer assembly comprises a pair of second washers provided with second mating engaging structures to control a rotation of the pair of second washers relative to each other around the second rotation axis.

11. The holder according to claim 10, wherein
the first adjusting force applying structure comprises a first axial force applying part for applying an axial pressing force on the first washer assembly; and/or
the second adjusting force applying structure comprises a second axial force applying part for applying an axial pressing force on the second washer assembly; and/or
the first rotation stop structure comprises a pair of first rotation stop structures disposed on the rotation shaft and one of the pair of first washers respectively to prevent a rotation of the rotation shaft and the one of the pair of first washers relative to each other around the first rotation axis; and/or
the second rotation stop structure comprises a pair of second rotation stop structures disposed on the pivotal shaft and one of the pair of second washers respectively to prevent a rotation of the pivotal shaft and one of the pair of second washers relative to each other around the second rotation axis.

12. The holder according to claim 11, wherein
the first axial force applying part comprises a first screw; and/or
the second axial force applying part comprises a second screw; and/or
one of the first mating engaging structures comprises a first boss, and the other of the first mating engaging structures comprises a first recess; and/or
one of the second mating engaging structures comprises a second boss and the other of the second mating engaging structures comprise a second recess; and/or
one of the pair of first rotation stop structures comprises a first tab, and the other of the pair of first rotation stop structures comprises a first groove; and/or
one of the pair of second rotation stop structures comprises a second tab, and the other of the pair of second rotation stop structures comprises a second groove.

13. The holder according to claim 9, wherein
the first slot has the circular arc of 160-180 degrees; and/or
the second slot has the circular arc of 105 degrees; and/or
the first recess and/or the second recess is configured as a hole; and/or
the first groove and/or the second groove is configured as an axial groove.

14. The holder according to any one of claim 1, wherein
the first hinge and/or the second hinge are disposed at a top end of the supporting arm opposite to the base; and/or
the first hinge and the second hinge are disposed at opposite sides of the supporting arm respectively; and/or
the first hinge extends along the second rotation axis at a first side of the first rotation axis and the second hinge extends along the second rotation axis at a second side of the first rotation axis; and/or
the first hinge and the second hinge are formed integrally.

15. The holder according to claim 14, wherein
the top end of the supporting arm is provided with a first receiving seat for receiving the first hinge and/or a second receiving seat for receiving the second hinge, which is opposite to the first receiving seat.

16. The holder according to claim 1, wherein
the cable is routed parallel to the first rotation axis inside the first rotation mechanism and is routed parallel to the second rotation axis and then perpendicular to the second rotation axis inside the second hinge, wherein a segment of the second hinge, in which cable is perpendicular to the second rotation axis, is connected to the monitor; and/or
the cable is connected to the monitor at a position which is not in line with the first rotation axis.

17. An assembly of the holder according to claim 1 and a monitor, wherein the holder is used for holding the monitor.

* * * * *